(12) United States Patent
Wang

(10) Patent No.: US 7,705,740 B2
(45) Date of Patent: Apr. 27, 2010

(54) METHOD AND MOBILE TERMINAL FOR GAS DETECTION WARNING

(75) Inventor: Dongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 11/536,523

(22) Filed: Sep. 28, 2006

(65) Prior Publication Data

US 2007/0069905 A1 Mar. 29, 2007

(30) Foreign Application Priority Data

Sep. 29, 2005 (CN) .................... 2005 1 0108126

(51) Int. Cl.
*G08B 21/00* (2006.01)
(52) U.S. Cl. .................. 340/632; 702/24; 702/25; 702/30; 702/27; 702/29
(58) Field of Classification Search .............. 340/632; 702/24, 122
See application file for complete search history.

(56) References Cited

U.S. PATENT DOCUMENTS

| 4,513,280 | A * | 4/1985 | Hannan et al. ............... 205/778 |
| 6,208,256 | B1 * | 3/2001 | Fleming et al. ............. 340/632 |
| 6,522,248 | B1 | 2/2003 | Andres et al. |
| 2002/0070869 | A1 * | 6/2002 | Dungan ....................... 340/632 |
| 2004/0085213 | A1 * | 5/2004 | Weng .......................... 340/632 |
| 2004/0145485 | A1 * | 7/2004 | Tice ............................ 340/632 |
| 2005/0267707 | A1 * | 12/2005 | Mian et al. .................. 702/122 |
| 2007/0005267 | A1 * | 1/2007 | Li ................................. 702/24 |
| 2007/0063828 | A1 * | 3/2007 | Drews et al. ................. 340/442 |

FOREIGN PATENT DOCUMENTS

| CN | 1556647 | 12/2004 |
| CN | 2672780 | 1/2005 |
| GB | 2 380 041 A | 3/2003 |
| NL | 1 026 903 C1 | 11/2004 |

OTHER PUBLICATIONS

European Search Report for EP 06 12 1409.4, dated Jan. 9, 2007.

* cited by examiner

*Primary Examiner*—Davetta W Goins
*Assistant Examiner*—Ojiako Nwugo
(74) *Attorney, Agent, or Firm*—Slater & Matsil, L.L.P.

(57) ABSTRACT

A method and a mobile terminal for gas detection warning are disclosed to solve the problem that people cannot detect gas by themselves due to the lack of a portable gas detecting apparatus. The mobile terminal is portable and typically includes a central control unit, a gas detection unit, a warning unit and a user interface unit. The apparatus performs a warning operation by using a warning policy corresponding to the detected air concentration by setting warning policies corresponding to a kind of gas in different concentration ranges respectively.

16 Claims, 2 Drawing Sheets

METHOD AND MOBILE TERMINAL FOR GAS DETECTION WARNING

RELATED APPLICATIONS

This patent application makes reference to, claims priority to and claims benefit from Chinese Patent Application No. 200510108126.1 filed on Sep. 29, 2005, which is explicitly incorporated herein by reference in its entirety.

FIELD OF THE INVENTION

The present invention relates to mobile terminal techniques, and more particularly to a method and a mobile terminal for gas detection warning.

BACKGROUND OF THE INVENTION

With the increasing consciousness of personal health and environmental protection, it becomes more and more common to use a gas detecting apparatus. For instance, after decoration of a room, people often use the gas detecting apparatus to detect the air quality in the room, so as to determine whether the content of harmful gas in the room exceeds a permissible standard, and whether the room is suitable for living. The prior gas detecting apparatus is generally a specialized one provided by a professional gas detection organization. It normally has a large size and is not convenient for carrying on, and its operation is quite complex. If one needs gas detection, she has to invite a skilled person from the professional gas detection organization to sample and analyze the gas to be detected by using the gas detecting apparatus so as to get the gas detection results. Because in the related art, there is no type of gas detecting apparatus that is potable and can be used conveniently by a consumer anywhere and anytime, people cannot detect the gas by themselves and cannot learn the concentration of harmful gas as well as the danger degree in the environment they are staying at real time.

Mobile terminals are widely used since they are portable and easy to use, but the prior mobile terminals generally only have a single function of communication, and people generally use them for talking and sending short messages. A mobile terminal with a function of gas detection warning has not arisen so far.

SUMMARY OF THE INVENTION

Accordingly, the present invention provides a method and a mobile terminal for gas detection warning, which substantially solve the problem in the related art that people cannot detect gas by themselves due to the lack of a portable gas detecting apparatus.

In a first aspect, the presently described technology provides a method for warning by gas detection. The method includes the steps of:
  setting warning policies in a mobile terminal corresponding to at least one kind of gas in different concentration ranges respectively;
  detecting a gas by the mobile terminal;
  adopting a warning policy by the mobile terminal in accordance with the detected concentration of the gas; and
  performing a warning by the mobile terminal in accordance with the adopted warning policy.

In accordance with this method, the gas being detected may include only one kind of gas or a combination of several kinds of gas.

The step of setting warning policies may include the steps of:
  setting warning levels corresponding to various types of gas in different concentration ranges respectively; and
  setting warning policies corresponding to the different warning levels respectively.

If the gas being detected is a mixture of several gases, the mobile terminal can perform a warning based on the warning policy corresponding to the highest warning level in the warning levels of the several detected gases.

The warning policies may include, for example, dialing an emergency call, ringing, vibrating, and combinations thereof.

Preferably, the step of performing a waning by the mobile terminal further includes displaying the detected gas type and concentration by the mobile terminal.

In another aspect, the presently described technology provides a mobile terminal for gas detection warning. The mobile terminal is portable and includes a central control unit, and further includes:
  a gas detection unit for detecting the type and concentration of at least one kind of gas;
  a warning unit for obtaining a warning policy based on a detection result of the type and concentration of a gas and a preset corresponding relation between the gas concentration and the warning policy; and
  a user interface unit for displaying the detection result of the gas type and concentration and performing a warning operation in accordance with the obtained warning policy.

The gas detection unit can be set within the mobile terminal or outside the mobile terminal and connected to the mobile terminal via a peripheral interface.

The central control unit is connected to the gas detection unit, the warning unit and the user interface unit respectively. In accordance with one embodiment, the central control unit sends the detection results of the gas type and concentration from the gas detection unit to the warning unit and controls the user interface unit to perform a corresponding warning operation in accordance with the warning policy from the warning unit. The central control unit can, for example, receive the detection results of the gas type and concentration from the gas detection unit in a manner of interruption or inquiry.

The wanting policies may include, for example, dialing an emergency call, ringing, vibrating, and combinations thereof.

The present invention has one or more of the following advantages: The present invention integrates a gas detecting device into a mobile terminal and makes it possible for the mobile terminal to perform a warning by using a corresponding warning policy according to the detected gas concentration by setting the wanting policies corresponding to various types of gas in different concentration ranges, which thereby effectively solves the problem in the related art that the gas detecting apparatus cannot be employed anywhere and anytime, so that people can detect the gas at any time and take effective steps to break away and escape from dangers according to the warnings. Therefore, the accident possibility is reduced.

DETAILED DESCRIPTION OF THE INVENTION

The present invention provides a mobile terminal with a function of gas detection warning, which can adopt a warning policy to perform a warning according to the detected air concentration. The principal implementing principles and preferred embodiments of the present invention will be described in details below with reference to the accompanying drawings.

Figure 1:
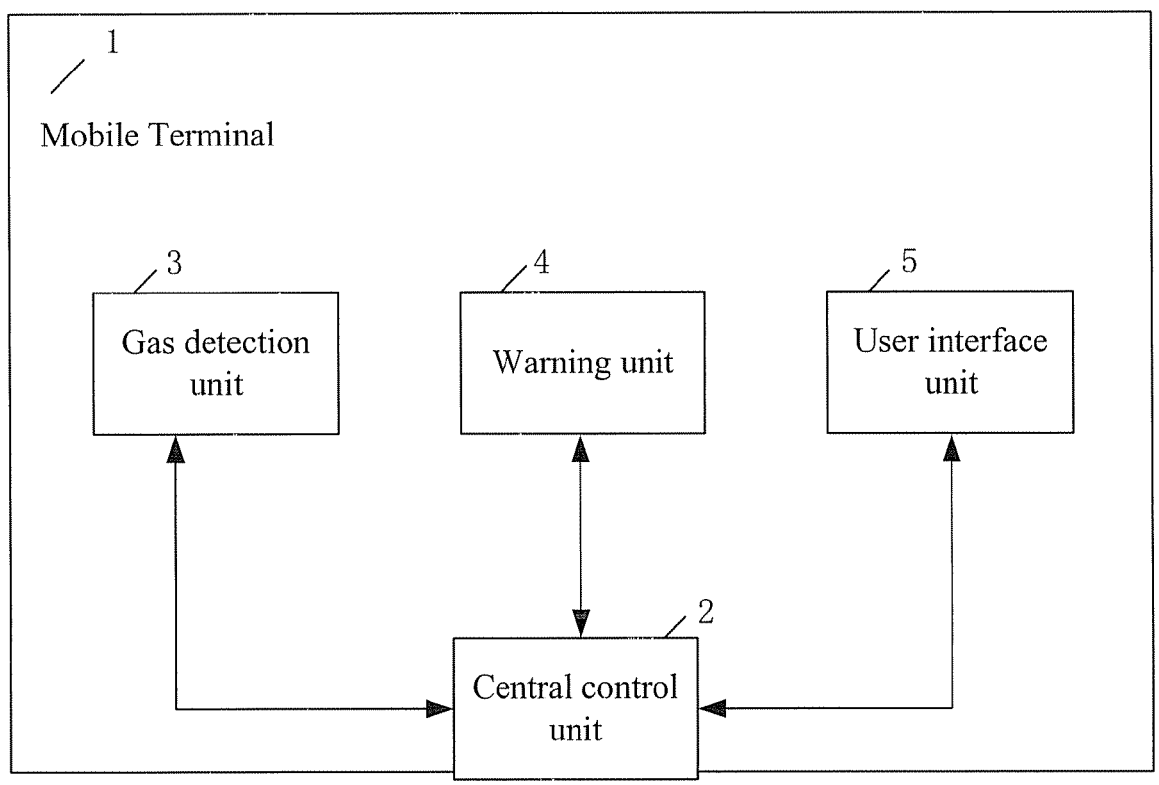
FIG. 1 is a schematic block diagram showing the structure of a mobile terminal according to an embodiment of the present invention.

FIG. 1 is a schematic block diagram showing the structure of a mobile terminal 1 according to an embodiment of the present invention. As shown in FIG. 1, the mobile terminal 1 typically includes a central control unit 2, and a gas detection unit 3, a warning unit 4 and a user interface unit 5 which are connected to the central control unit 2 respectively. The central control unit 2 is mainly used to coordinate the operations of the other units.

In accordance with this embodiment, the central control unit 2 receives a gas detection command from a user via the user interface unit 5 and sends the command to the gas detection unit 3. The gas detection unit 3 receives the gas detection command from the central control unit 2, detects the gas type and concentration according to the command, and then sends the detection result of the gas type and concentration to the central control unit 2, which then sends the detection results to the warning unit 4. The warning unit 4 receives the detection result of the gas type and concentration from the central control unit 2, then determines a warning policy based on the detection result and the preset corresponding relation between the gas concentration and the warning policy, and sends the warning policy to the central control unit 2. The central control unit 2 receives the warning policy from the warning unit 4, and sends a control command for performing a corresponding warning operation to the user interface unit 5 based on the warning policy. At the same time, the central control unit 2 can send the detection result of the gas type and concentration to the user interface unit 5. The user interface unit 5 receives the detection result of the gas type and concentration from the central control unit 2, displays the results, and performs the corresponding warning operation under the control of the central control unit 2.

The gas detection unit 3 can be set within the mobile terminal or be set outside the mobile terminal and connected to the mobile terminal via a peripheral interface, e.g. Infrared Data Association, Bluetooth, etc.

Figure 2:
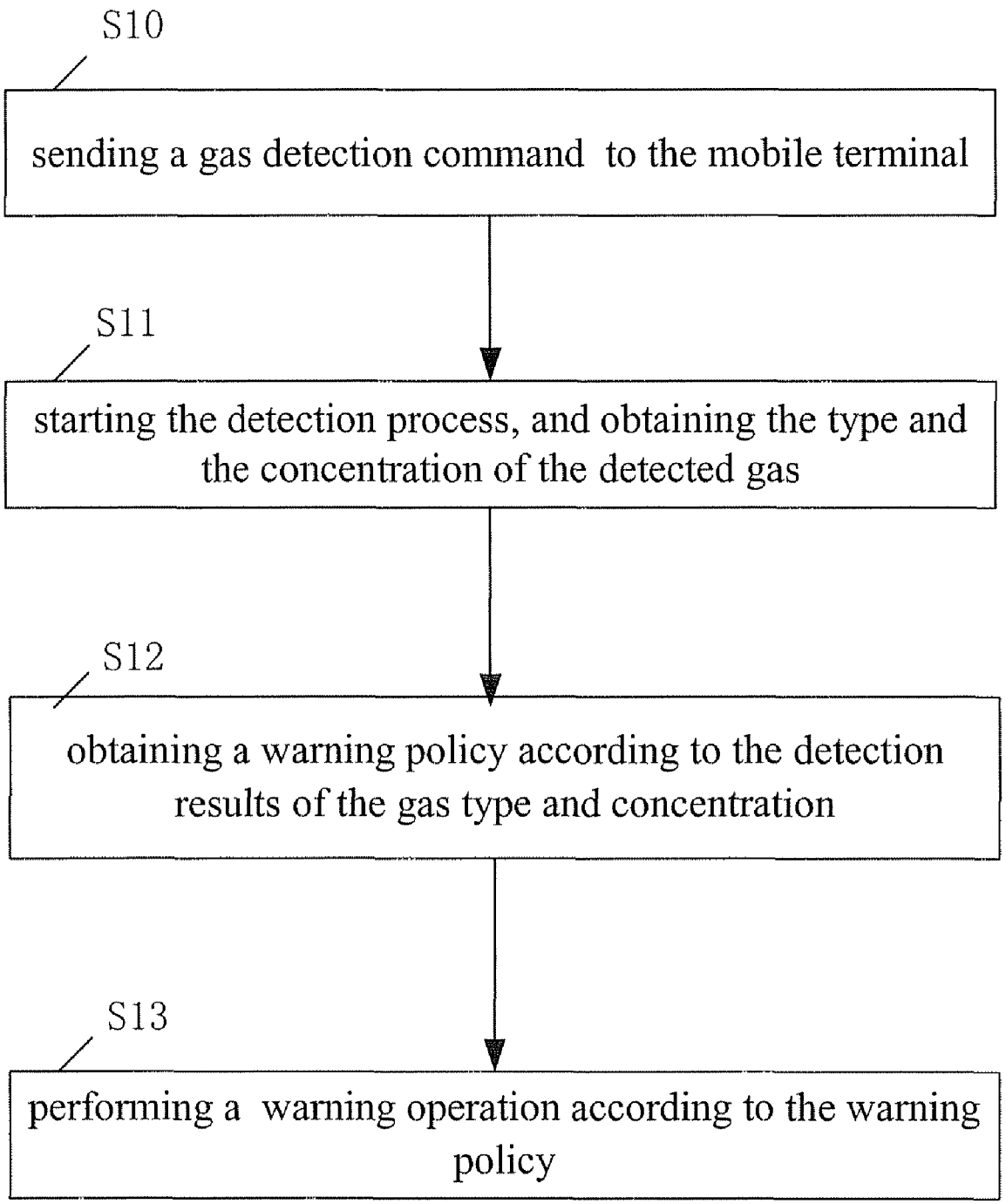
FIG. 2 is a flow chart showing a gas detection warning process according to an embodiment of the present invention.

FIG. 2 is a flow chart showing a gas detection warning process according to another embodiment of the present invention. Referring to FIG. 2 together with FIG. 1, the main realization procedure of the gas detection warning process is as follows.

In step S10, a user sends a gas detection command to the mobile terminal 1 via the user interface unit 5, and the central control unit 2 in the mobile terminal 1 receives the gas detection command from the user.

In step S11, the central control unit 2 sends the gas detection command to the gas detection unit 3, and the gas detection unit 3 starts the gas detection process to obtain the type and concentration of the harmful gas in the detected air by sampling the detected gas. Here, a plurality of gas sensors for detecting various types of gas can be arranged in the gas detection unit 3.

In step S12, the central control unit 2 obtains the detection result of the gas type and concentration from the gas detection unit 3 in a manner of interruption or inquiry, and sends the detection result to the warning unit 4. Then the warning unit 4 obtains a warning policy based on the corresponding relation between the gas concentration and the warning policy preset in the warning unit 4, and sends the obtained warning policy to the central control unit 2.

If the central control unit 2 recognizes that the format of the detection result of the gas type and concentration is not correct or the content of the detection result is incomplete, the central control unit 2 sends a command for resending the detection result to the gas detection unit 3.

The corresponding relation between the gas concentration and the warning policy preset in the warning unit 4 can be set by the manufacturer according to the safety of various types of gas and the harmful degree for the human body. The present embodiment presets the corresponding relation between the gas concentration and the warning policy in the warning unit 4 by setting respective warning levels each of which is corresponding to one type of gas in different concentration ranges, and setting respective warning policies corresponding to different warning levels.

If the detection result acquired by the central control unit 2 indicates that the detected air contains several types of harmful gas, each of which is corresponding to a different warning policy, the warning unit 4 outputs the warning policy with the highest warning level to the central control unit 2.

It is to be noted that in the inquiry manner, the central control unit 2 reads and measures the status of a periphery device through an execution program, and performs the input or output command to exchange data with the periphery device. In other words, the central control unit 2 enquires the gas detection unit 3 continuously and the gas detection unit 3 responds to the inquiry from the central control unit 2 and returns the sampled data.

In the interruption manner, a corresponding processing program (service program) is invoked when an abnormal case occurs. In other words, when a kind of harmful gas is detected going beyond the standard level, the gas detection unit 3 issues an interruption request, and the central control unit 2 responds to that request.

The corresponding relations between the warning levels and the various types of gas in different concentration ranges will be explained below by taking CO and $H_2S$ as examples (the unit of concentration is ppm, representing the volume values of the detected gas contained in the air per a million volume values):

| Gas type | Concentration | Warning level |
| --- | --- | --- |
| CO | >200 ppm | A |
|  | 35 ppm-200 ppm | B |
|  | <35 ppm | C |
| H2S | >15 ppm | A |
|  | 10 ppm-15 ppm | B |
|  | <10 ppm | C |

The corresponding relations between the warning policies and the different warning levels are shown as follows.

| Warning level | Warning policy |
| --- | --- |
| A | starting emergency call function, automatically playing voice recording for help + ringing + vibrating |
| B | ringing + vibrating |
| C | vibrating |

For instance, if the gas detection unit 3 detects that the detected gas is CO and its concentration is 75 ppm, the warning policy obtained by the warning unit 4 is ringing and vibrating.

In step S13, the central control unit 2 receives the warning policy from the warning unit 4, sends a control command for performing a corresponding warning operation to the user interface unit 5 according to the warning policy and simultaneously sends the detection result of the gas type and concentration to the user interface unit 5. The user interface unit 5 receives the detection result of the gas type and concentration from the central control unit 2, displays the result, and further informs the related interfaces to perform the corresponding warning operation under the control of the central control unit 2, e.g., starting the emergency call function if an emergency call is needed, or automatically playing voice recording for emergency help, etc.

Though illustration and description of the present invention have been given with reference to preferred embodiments thereof, it should be appreciated by ordinary personnel skilled in the art that various changes in forms and details can be made without deviation from the spirit and scope of this invention as defined by the appended claims.

What is claimed is:

1. A method for gas detection warning, comprising the steps of:
    setting warning levels in a mobile terminal, the warning levels corresponding to more than one kind of gas in different concentration ranges respectively;
    setting warning policies corresponding to the warning levels for the more than one kind of gas respectively;
    detecting the more than one kind of gas by the mobile terminal;
    determining the warning levels of each kind of gas;
    adopting a warning policy corresponding to a highest warning level among the warning levels of the detected more than one kind of gas; and
    performing a warning by the mobile terminal in accordance with the adopted warning policy.

2. The method according to claim 1, wherein each of the warning policies comprises at least one of: dialing an emergency call, ringing, and/or vibrating.

3. The method according to claim 1, wherein the step of performing a warning by the mobile terminal further comprises displaying the plurality of concentrations and the corresponding type of the plurality of gasses by the mobile terminal.

4. A mobile terminal for gas detection warning, comprising:
    a central control unit;
    a gas detection unit for detecting types and concentrations of more than one kind of gas;
    a warning unit for setting therein warning levels corresponding to the more than one kind of gas in respective concentration ranges, and setting warning policies corresponding to the respective warning levels in advance, determining the warning levels for each kind of gas, and obtaining a warning policy corresponding to a highest warning level based on the detection result; and
    a user interface unit for displaying the detection result and performing a warning operation in accordance with the obtained warning policy.

5. The mobile terminal according to claim 4, wherein the gas detection unit is set within the mobile terminal.

6. The mobile terminal according to claim 4, wherein the gas detection unit is set outside the mobile terminal and connected to the mobile terminal via a peripheral interface.

7. The mobile terminal according to claim 4, wherein the central control unit is connected to the gas detection unit, the warning unit and the user interface unit respectively, and the central control unit sends the detection result from the gas detection unit to the warning unit and controls the user interface unit to perform the warning operation in accordance with the warning policy from the warning unit.

8. The mobile terminal according to claim 7, wherein the central control unit receives the detection result from the gas detection unit in a manner of at least one of: an interruption and/or an inquiry.

9. The mobile terminal according to claim 4, wherein the warning operation comprises at least one of: dialing an emergency call, ringing, and/or vibrating.

10. A mobile terminal for gas detection warning, comprising:
    a central control unit for controlling and coordinating operations of the mobile terminal;
    a gas detection unit connected to the control unit, for detecting types and concentrations of each of a plurality of gasses to form a detection result;
    a warning unit connected to the control unit, for setting therein warning levels corresponding to the concentration of each of the plurality of gasses in a respective plurality of concentration ranges, and warning policies corresponding to the warning levels in advance, and determining a warning policy corresponding to a highest warning level among the warning levels of the detected plurality of gasses; and
    a user interface unit for displaying the detection result, wherein, the central control unit gets the determined warning policy from the warning unit and controls the user interface unit to perform the warning operation according to the determined warning policy.

11. The mobile terminal according to claim 10, wherein the gas detection unit is set within the mobile terminal.

12. The mobile terminal according to claim 10, wherein the gas detection is set outside the mobile terminal and connected to the mobile terminal via a peripheral interface.

13. The mobile terminal according to claim 10, wherein the central control unit receives the detection result from the gas detection unit and sends the detection result to the warning unit, and wherein the warning unit determines the warning policy according to the detection result, and transmits the warning policy to the central control unit.

14. The mobile terminal according to claim 10, wherein the central control unit receives the detection result from the gas detection unit in a manner of interruption or inquiry.

15. The mobile terminal according to claim 10, wherein a warning operation according to the warning policy comprises at least one of: dialing an emergency call, ringing, and/or vibrating.

16. The method according to claim 1, wherein the more than one kind of gas includes CO and $H_2S$.

* * * * *